Jan. 4, 1938.  G. B. MARZOLF  2,104,467
LIQUID REFRIGERATING DISPENSER
Filed April 22, 1935  3 Sheets-Sheet 1
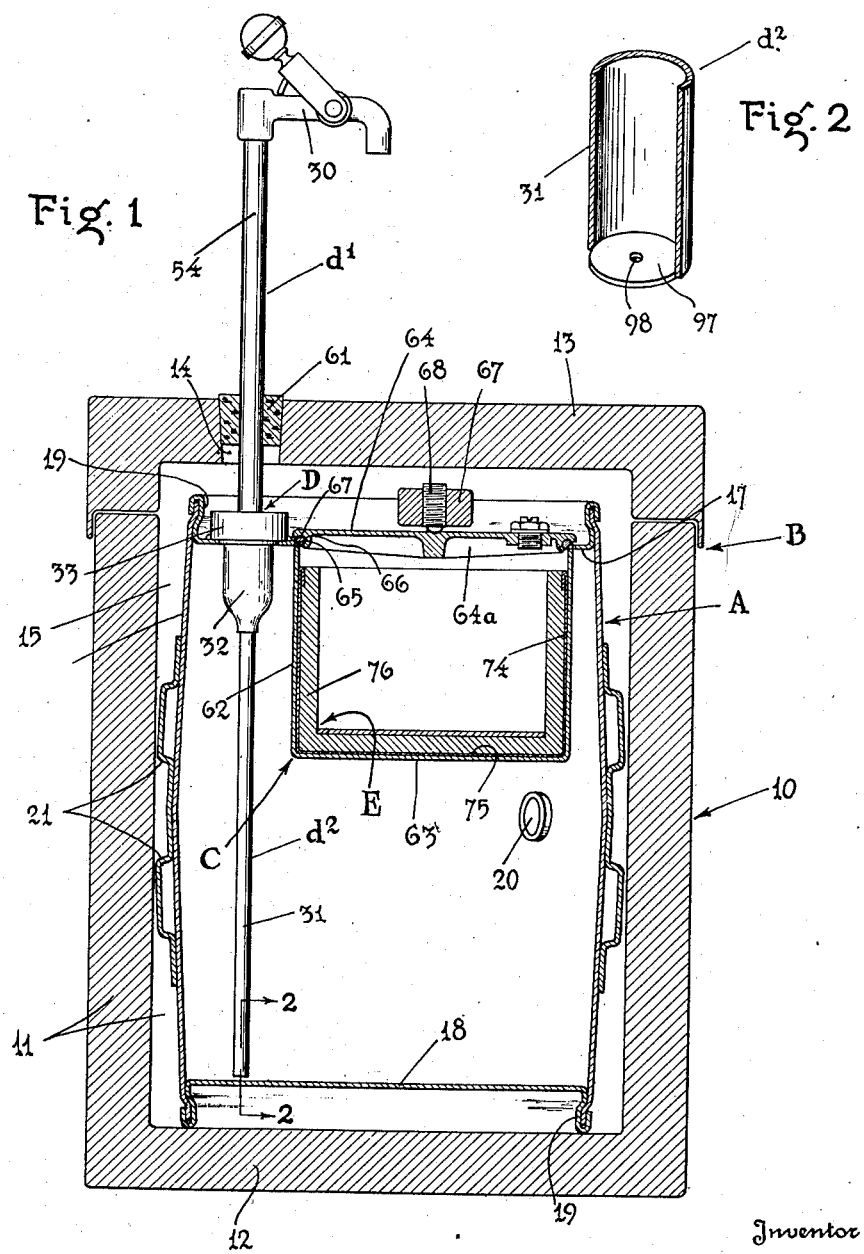
Inventor
George B. Marzolf
By Caswell + Lagaard
Attorneys Jan. 4, 1938.   G. B. MARZOLF   2,104,467
LIQUID REFRIGERATING DISPENSER
Filed April 22, 1935   3 Sheets-Sheet 2
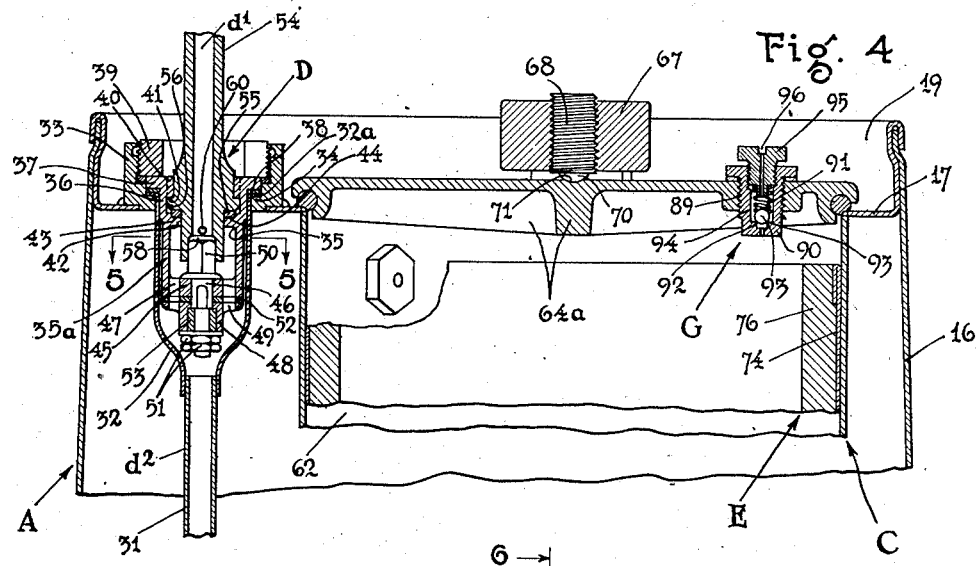
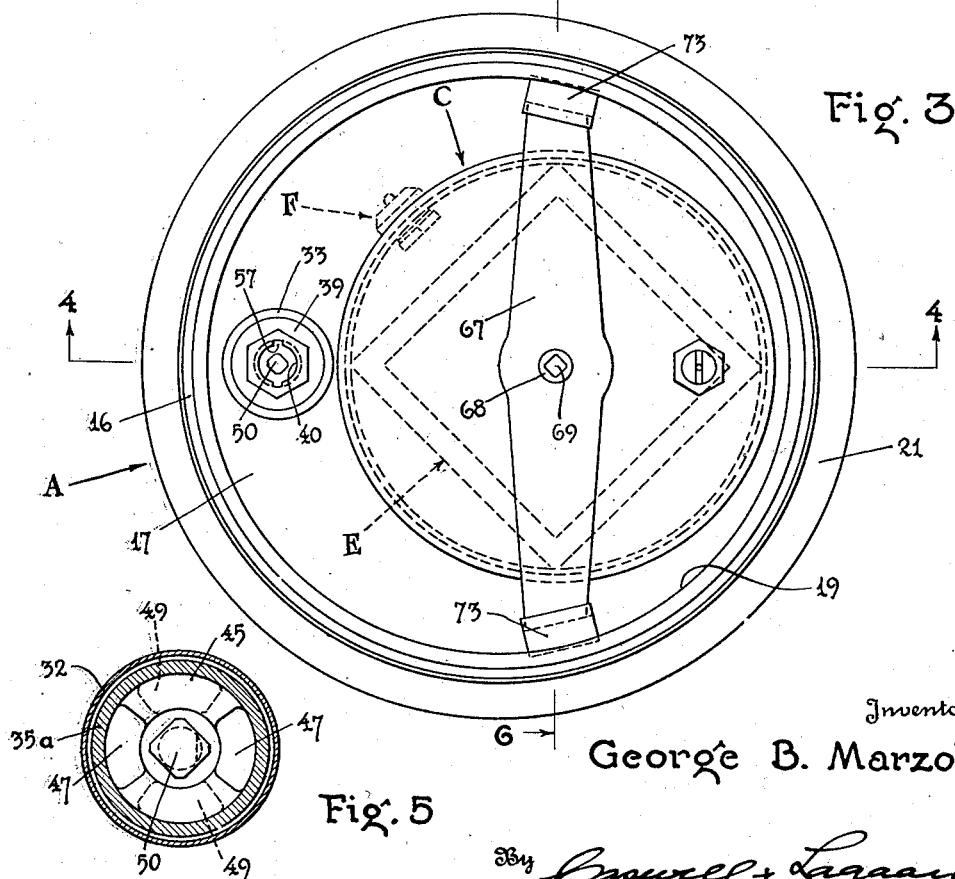
Inventor
George B. Marzolf
By Crowell + Lagaard
Attorneys Jan. 4, 1938.  G. B. MARZOLF  2,104,467
LIQUID REFRIGERATING DISPENSER
Filed April 22, 1935  3 Sheets-Sheet 3
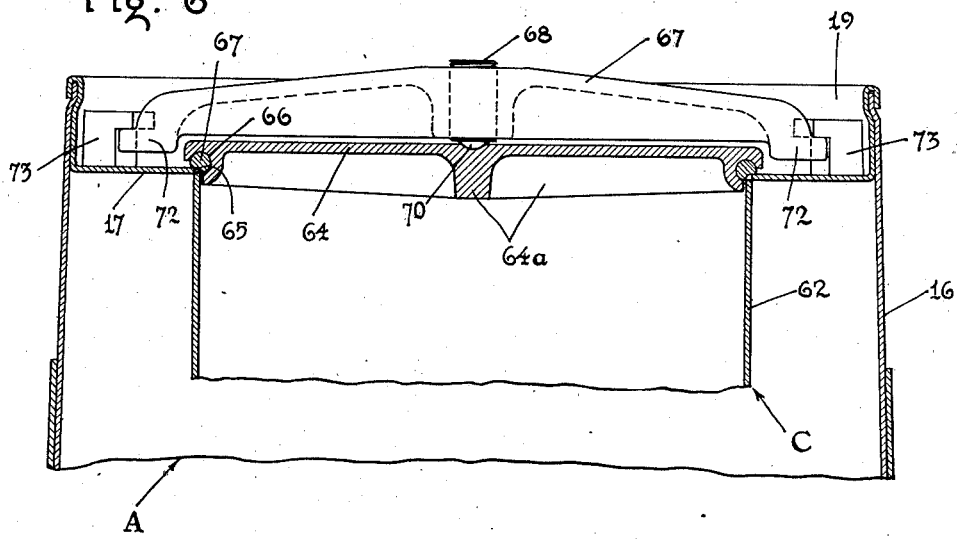
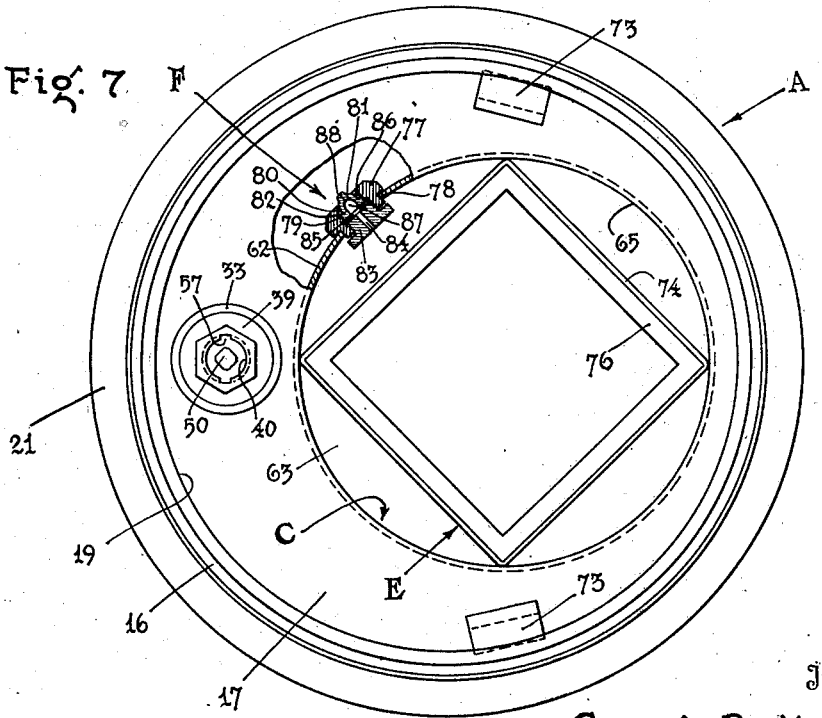
Inventor
George B. Marzolf Patented Jan. 4, 1938

2,104,467

UNITED STATES PATENT OFFICE 2,104,467

LIQUID REFRIGERATING DISPENSER

George B. Marzolf, St. Paul, Minn., assignor to Farwell Ozmun Kirk & Co., St. Paul, Minn., a corporation of Minnesota Application April 22, 1935, Serial No. 17,638

10 Claims. (Cl. 225—1)

My invention relates to improvements in devices of the character disclosed in my copending application for patent for Refrigerating dipensers for beverages, filed August 24, 1933, under Serial No. 686,544.

In breweries, beer containers in the form of kegs are cleansed, filled and otherwise handled, principally in conventional machines, according to standard practices, the kegs, at times, being rolled and, at times, grasped by the chines. At the brewery, beer is kegged and kept at a temperature somewhat below 45° F., the optimum temperature for consumption, and at the same time is kept under a pressure of carbon dioxide gas at approximately thirty-eight pounds to "hold" the beer and keep it from becoming flat. A conditioned keg of beer delivered for consumption, in most cases, requires additional refrigeration to maintain the temperature of the beer at 45° F. or thereabouts and requires the introduction into the keg of a pressure medium, preferably carbon dioxide gas, for augmenting the initial pressure as the beer is "drawn" (expelled) under pressure.

In drawing beer from a keg with the usual equipment, it is often accompanied by an undesirable quantity of foam of undesirable consistency particularly when the beer within the keg is being disturbed or has not been allowed to stand for a time after being disturbed.

An object of this invention is to provide a relatively inexpensive and sanitary beverage dispensing device of the present nature in which solid carbon dioxide may be conveniently, economically and efficiently employed as a medium for refrigerating the beverage and also for producing pressure to dispense the same.

Another object of the invention is to provide a device, as above, in which the beverage container may be handled conveniently in the manner of the ordinary keg in conventional brewery practice.

A further object of the invention is to provide an improved dispensing device of the present character in which beer may be refrigerated and "held" in proper condition for consumption and from which such beer may be properly dispensed under suitable gaseous pressure.

Other objects of the invention reside in the novel combination and arrangement of parts and in the details of construction hereinafter illustrated and/or described.

In the drawings, Fig. 1 is a vertical central sectional view of a dispensing apparatus embodying my invention; Fig. 2 is a sectional perspective view in detail of the receiving end of the draft tube, said view being taken as on the line 2—2 of Fig. 1; Fig. 3 is a plan view of the keg or container for the liquid to be dispensed; Fig. 4 is a fragmentary sectional view in detail of the upper portion of the keg, said view being taken as on the line 4—4 of Fig. 3; Fig. 5 is a detail sectional view taken as on the line 5—5 of Fig. 4; Fig. 6 is also a fragmentary sectional view of the upper portion of the keg, the same being taken as on the line 6—6 of Fig. 3; Fig. 7 is a plan view of the keg with the cover of the carbon dioxide receptacle removed and with certain portions broken away to reveal the construction of the vent leading from said receptacle into the interior of the keg.

Reference being had to the drawings, it will be noted that the structure shown in Fig. 1, includes a container or keg indicated in its entirety by the reference character A and further includes a heat insulating case B in which the container is removably received and housed.

The insulating case B, illustrated diagrammatically in Fig. 1, may be of any suitable construction, such, for example as the case illustrated in my copending application, Serial No. 686,544, wherein, as in the present application, the case includes a body 10 having sides 11 and a bottom 12 and further includes a cover 13 removably applicable to said body, said cover having an opening 14 therein for a conduit by means of which a container within the case is tapped. This case is preferably, though not necessarily, square in cross-section and is so proportioned internally that it will receive the container A on end and provide a space 15 between the inner wall surfaces thereof and the sides and top of the container.

The keg-like container A, constructed of sheet metal, includes a cylindrical side wall 16 and upper and lower heads 17, 18 inset from the ends of the side wall to provide chines 19, which afford means through which the container may be handled manually and by the conventional keg handling machinery commonly used in breweries and like establishments. The side wall 16 is formed with the usual filling bung 20 at a point midway between the heads 17, 18 and is provided with hoops 21 at either side of the bung upon which the container may be rolled in the usual manner.

A dispensing conduit D, comprising upper and lower conduit sections $d^1$ and $d^2$, conducts liquid under pressure from the bottom of the container to a valve or faucet 30, incorporated in the upper conduit section $d^1$. In the construction of said sectional conduit D (Figs. 1 and 4), the lower section consists of a tube 31, having an enlarged tubular member 32 at its upper end, said member being formed with an outwardly turned flange 32a at the extremity thereof. This conduit section $d^2$ is received in the bore of a boss 33 fitted in an opening in the head 17 of the container and welded to said head. Said boss 33 is formed with an internal annular shoulder 34 providing a seat for the flange 32a of the member 32, as best seen in Fig. 4. Disposed mainly within the said enlarged tubular member 32 is a coupling 35 through which the two conduit sections $d^1$ and $d^2$ are connected, said coupling having valve means incorporated therein and adapted to be actuated by the conduit section $d^1$, when the same is manipulated in connecting it with and disconnecting it from the lower conduit section $d^2$. Said coupling 35 has a substantially tubular body 35a and a head 36 formed with an external flange 37. Except upon being removed to be cleansed or replaced or repaired, the coupling 35 occupies a position within the boss 33 and tubular member 32. In this position of the coupling 35, the flange 37 bears against a gasket 38 which in turn bears against the flange 33 of said tubular member 32. An annular locknut 39 threaded externally and fitting internal threads in the boss 33, clamps between it and the shoulder 34 on said boss the said flanges 33 and 37 and the gasket 38, such construction serving rigidly to hold the conduit section $d^2$ and coupling 35 in place and without leakage at the joint between said conduit section $d^2$ and boss 33. The head 36 of the coupling 35 is formed with an internal annular flange 40, providing a shoulder 41, a second internal flange 42 on the body 35a of the coupling 35 providing a second shoulder 43. These shoulders 41 and 43 are spaced apart and face each other, the latter supporting a gasket 44 for a purpose soon to appear. At its lower end, the tubular body 35a of the coupling 35 is formed with a web or valve seat 45 (Fig. 5), the central portion of which provides a bearing wherein a valve stem 46 is rotatably mounted, diametrically opposed arcuate portions of said web being cut away to form ports 47. A valve head 48 mounted on and turned by the stem 46 is formed with ports 49 corresponding with the ports 47 in the web 45. A shouldered head 50 on the valve stem 46 bears against the upper face of the web 45, nuts 51 on the lower threaded end of said stem serving to maintain a tight turning fit between the valve head 48 and the lower face of the apertured web 45. The valve head 48 is provided with an apertured facing disk 52 and with a tubular gasket 53 encircling the stem 46 to render the valve structure pressure tight. The upper conduit section $d^1$, which consists of a tube or pipe 54, is enlarged at its lower end, an annular shoulder 55 being provided in such construction. Above this shoulder 55 the said enlarged portion of said conduit section $d^1$ is formed with diametrically opposed ears 56 which are received in slots 57, (Fig. 3), formed in the internal flange 40 of the coupling member 35, the upper surfaces of said ears 56 being formed to provide cams for engagement with the shoulder 41 of the internal flange 40. At the lower extremity of said conduit section $d^1$, the bore therein is enlarged and shaped to provide a socket 58 conforming with the shouldered head 50 of the valve stem 46. Immediately above said socket 58 and for the purpose of bringing said bore into communication with the interior of the coupling member 35, said tubular conduit section $d^1$ is provided with diametrically opposed apertures 60 therein.

In applying the conduit $d^1$ to the coupling member 35, the lower end thereof is inserted into said member, the ears 56 thereon entering the slots 57 and the socketed extremity thereof fitting over the shouldered head 50 of the valve stem 46. The conduit section $d^1$ is then turned to the right. In thus turning said section, the upper cam surfaces of the ears 56 coact with the shoulder 41 and force the shoulder 55 of said conduit section against the gasket 44. Concurrently therewith, the socketed extremity of said conduit section $d^1$ turns the valve stem 46, bringing the ports 49 of the valve head 48 into registration with the ports 47 in the valve seat 45 whereupon communication, under control of the faucet 30, is had with the interior of the container A through the conduit sections $d^2$ and $d^1$.

In detaching the conduit section $d^1$, it is first turned to the left to bring the ears 56 back into registration with the slots 57. Concurrently, the valve head 48 is turned into position, obstructing the ports 47 in the valve seat 48 of the coupling member 35. Thus, the valve structure in the coupling member is closed and the conduit section $d^1$ freed for detachment from the container A.

With the container A disposed within the case B, as shown in Fig. 1, and with the cover 13 of said case in place on the body thereof, the application of the conduit section $d^1$ to the container is effected by passing the lower end of said conduit section through the opening 14 in said cover, and then securing said end of said section to the coupling member as previously explained. A stopper 61, slidably carried by the conduit section $d^1$, fits into the opening 14 in the cover 13, sealing said opening and bracing said section through the cover.

Incorporated within the container structure is a receptacle C for solid carbon dioxide. This receptacle includes a body of sheet metal consisting of a cylindrical side wall 62 and bottom 63 and further includes a cover 64. The body of said receptacle C is eccentrically disposed within the container A, said receptacle, the conduit section $d^2$ and the bung 20 of the container being relatively disposed as shown in Fig. 1. The upper edge of the cylindrical wall 62 of said receptacle C is welded to the head 17 of the container at a marginal portion thereof encircling an opening formed therein, the salient angle at the junction between the head 17 and side wall 62 forming an annular seat 65 at the upper end of the container. The cover 64 of the receptacle C is preferably a cast disk formed with radial reinforcing ribs 64a at the under side thereof and further formed with a circumferential groove 66 at its lower margin, said groove containing an annular gasket 67 adapted to engage the annular seat 65 at the mouth of the receptacle body when said cover is in place to close said receptacle. This cover is releasably clamped in place by means of a yoke-bar 67 fitted with a clamping screw 68 intermediate its ends, said screw having a square socket 69 in the upper end thereof to receive a wrench and having a rounded lower end 70 adapted to be received in a complementary depression or seat 71 centrally formed in the cover 64. Terminal ears 72 on the clamping bar 67 engage the lower sides of overhanging lugs 73 fitted in the reentrant angle between the head 17 and chine 19, said lugs being secured, as by welding, to said head and chine.

Removably applicable to the body of the receptacle C is a square box or receiver E for the solid carbon dioxide to be contained within said receptacle, said receiver consisting of a shell of sheet metal having sides 74 and a bottom 75 lined with a relatively thick heat insulating lining 76. When this receiver E is in its place within the body of the receptacle C, the bottom 75 of the receiver rests upon the bottom 63 of the receptacle, while the upright corners of the receiver stand closely adjacent to the cylindrical wall 62 of the receptacle. In thus fitting the square receiver E to the cylindrical body 62 of the receptacle, the former is held against sidewise movement in the latter. Yet, contact between the sides of the receiver and the side wall of the receptacle is confined to line contact and at most is limited to four lines at the four corners of the receiver. The depth of the receiver E is such that a space is left between the top thereof and the cover 64 of the receptacle C and this space is in communication with the spaces between the sides of the receiver E and the cylindrical wall 62 of the receptacle. Thus, it will be understood that the cold carbon dioxide gas generated from the solid carbon dioxide "melting" in the receiver E will flow over the rim of the receiver into the spaces between the sides of receiver and receptacle where such gases will contact the receptacle wall 62 and also portions of the bottom 63 of said receptacle. In this connection, it may be noted that the said carbon dioxide in the receiver is well insulated against the transference of heat thereto by conductivity through the structure of said receiver.

Two vents F and G provide for the escape of gaseous carbon dioxide from the receptacle C, the vent F leading into the interior of the container A and the vent G leading to the outside of said container into the space between the container and the interior of the case B. In providing the vent F, a boss 77 (Fig. 7) is fitted in an opening 78 in the wall 62 of the receptacle C and welded to said wall. This boss has an axial bore 79 threaded at its inner end and reduced in diameter at its outer end to form an annular shoulder 80. A rubber valve member 81 of well known construction fits into the bore 79 of said boss 77, said valve member having an annular shoulder 82 for cooperation at one side thereof with the shoulder 80 on the boss 77 and at the other side thereof with a plug 83 screwed into the threaded end of the boss 77 and formed with an axial bore 84 therein. Suitable gaskets 85, 86, occupying positions at opposite sides of the shoulder 82 of the valve member 81, respectively engage the shoulder 80 of the boss 77 and the inner end of the plug 83. In said vent F, communication between the interior of the receptacle C and the interior of the container A is had through the bore 84 of the plug 83, the chamber 87 in the valve member 81 and the slit 88 in said member. Said valve member 81, while readily admitting of the passage of gaseous carbon dioxide from the receptacle C to the interior of the container A, prevents any reverse flow of gas or liquid from the interior of the container to the interior of said receptacle C. In providing the vent G (Fig. 4), a threaded bore 89 is formed in the cover 64 of the receptacle. A fitting 90 formed with an axial bore 91 is screwed into the bore 89 of the cover 64 from the outside. The outer end of the bore 89 is internally threaded, the inner end thereof being reduced to form a valve seat 92. A ball valve 93 resting on said seat 92 is backed by a compression spring 94 which, in turn, is backed by a plug 95 screwed into said threaded end of said bore, said plug being formed with an axial bore 96 which together with the bore 91 in the fitting 90 establishes communication between the interior of the receptacle C and the exterior thereof when the ball valve 93 is unseated. A greater or lesser pressure of the carbon dioxide gas within the receptacle C unseats said ball valve 93 according to the adjustment of the plug 95 which increases or diminishes the compression of said spring 94, the adjustment of said plug being determined by the gaseous pressure desired within the interior of the container. Experience shows that the pressure of the gaseous carbon dioxide within the container should not substantially exceed that which is amply sufficient for the expulsion of the liquid from the container and at the same time sufficient for "holding" the liquid in proper condition. Accordingly, the plug 95 of the vent G is adjusted so that the ball valve 93 will yield to any pressure in excess of that elected to be maintained within the container A.

Gas in the spaces between the receiver E and the inner surfaces of the body of the receptacle C, not only cools the contents of the container by conduction through the receptacle wall 62 and bottom 63, but, at the same time supplements the receiver liner 76 as an insulation for the charge of solid carbon dioxide contained within said receiver. This feature prevents the wasteful dissipation of the refrigerant and affords perfect control of the generation of gas therefrom, the result being that the proper liquid dispensing pressure is provided within the container A and ample, but not excessive, refrigeration afforded by the gaseous carbon dioxide outside of said container and also inside thereof at its source.

The container A, with the receptacle cover 64 and receiver E removed, is handled by the usual equipment and in the same manner as the ordinary beer keg in the cleansing, filling, storing, and transportation thereof. Preparatory to dispensing the liquid from the container, the receiver E, charged with solid carbon dioxide, is placed in the receptacle C and the receptacle cover 64 clamped in place. Thereupon the charged container is placed within the case B and is tapped, through the cover of said case, by the application of the conduit section $d^1$ to its companion section $d^2$ as shown in Fig. 1. The gaseous carbon dioxide generated from the "melting" solid carbon dioxide within the receiver C flows over the upper edge of the receiver, thence down the sides thereof to the exposed portions of the bottom of said receiver, thence upwardly along the sides of said receiver and thence into the space between the top of the receiver and the receiver cover 64. When the gas within the receptacle builds up sufficiently to unseat the valve 93 in the vent G, the said gas escapes through said vent into the space between the head 17 of the container A and the cover 64 of the case B. Overflowing the top of the container A, the gas descends along the sides thereof to the bottom of the case B and thence ascends along the inner walls of the case, the pressure of said gas within the case being relieved by leakage primarily between the cover 13 and sides 11 of said case. From the foregoing, it will be understood that the contents of the container is cooled by conduction through the walls of the receptacle C which contact the gas within the receptacle and through the walls of the container which are exteriorly contacted by the gaseous carbon dioxide confined within the case B. When the liquid within the container A is expelled therefrom through the conduit D by the pressure initially built up therein upon the filling of said container, said pressure is reduced, but upon being reduced to an amount less than that of the gaseous pressure within the receptacle C, it is promptly restored and balanced with such pressure in the receptacle by the passage of gaseous carbon dioxide from said receptacle, through the vent F, to the interior of the container. This influx of replenishing gas to the interior of the container A has a further cooling effect upon the container contents. If the supply of solid carbon dioxide within the receiver C, becomes exhausted before the container is emptied, a replenishing supply may be introduced into said receptacle upon removing the cover 13 of the case B and the cover 64 of said receptacle.

It has been found in dispensing carbonated beverages under gaseous pressure and particularly beer, that the liquid is often initially discharged from the ordinary draft conduit in an excessively "wild" or foamy condition with the result that an appreciable quantity of the liquid is wasted before it flows from the conduit in suitable condition to be served. This is particularly true when it is attempted to serve the liquid from a container subjected to disturbances as on a railway train, boat or other means of transportation or from a container which after having been disturbed has not remained quiet long enough to allow the contents thereof to become settled. In the present construction, I provide means for preventing the discharge of the container contents from the draft conduit in the above noted objectionable state. This means consists of a thin disk-like end piece 97 (Fig. 2) applied to the inlet end of the tube 31 of the conduit section $d^2$, said end piece having a small central opening 98 therein through which liquid from the container A passes into said tube 31. In this construction, the lower end of the conduit tube has a restricted inlet opening of relatively little axial length, the same opening abruptly into the relatively large bore of said tube 31. Optimum results have been secured with a draft tube of one-half inch inside diameter having a restricted inlet opening of from one-eighth of an inch to three-sixteenths of an inch in diameter. This restricted inlet opening in the draft conduit damps the flow of the liquid in the conduit, reducing the pressure and minimizing the turbulence of the said liquid therein. The result is to provide for the discharge of beer from the conduit in optimum condition—that is to say, in a condition in which the quantity of foam is in proper proportion relative to the clear liquid and in which such foam is of a fine and firm texture.

Changes in the specific form of my invention, as herein disclosed, may be made within the scope of what is claimed without departing from the spirit of my invention.

Having described my invention, what I claim as new and desire to protect by Letters Patent is:

1. In a dispenser of the character described, a closed liquid container, a conduit leading from the interior of the container for dispensing the liquid therefrom, a receptacle including a body incorporated within the container and opening to the outside through a wall thereof, a removable cover for the receptacle body, a heat insulated receiver for solid carbon dioxide removably disposed within said receptacle, said receiver having portions thereof closely adjacent to the receptacle body and other portions spaced from said body to expose inner portions thereof to the gas generated from the solid carbon dioxide in said receiver, said receptacle structure being vented to release gaseous carbon dioxide into the interior of said container and also to the outside, the venting of the gas to the outside being through a vent in the receptacle cover and under restriction such that the container is constantly charged with gas at the desired liquid dispensing pressure.

2. In a dispenser of the character described, a closed liquid container, a conduit leading from the interior of the container for dispensing the liquid therefrom, a receptacle incorporated within the container and including a body consisting of a cylindrical side wall portion and an end, said member being joined at its edge opposite said end to a wall portion of the container marginally of an opening therein, a removable cover for said receptable body, a heat insulated receiver for solid carbon dioxide removably disposed within said receptacle and having a side wall portion limited to line contact with the side wall portion of said receptacle, said receptacle body having a vent therein for releasing gaseous carbon dioxide directly into said container, and said receptacle cover having a vent therein for releasing gaseous carbon dioxide to the outside, said second vent having check means offering controlled resistance to the passage of the gas therethrough, whereby the container is constantly charged through said first vent with the gas under the desired liquid dispensing pressure.

3. In a dispenser of the character described, a closed liquid container of keg-like form having a filling bung in the side thereof, a receptacle for solid carbon dioxide including a body and a removable cover therefor, said body being disposed within the container and incorporated in the structure of one of its heads in position offset from the center of such head in the direction of said bung, a conduit leading from the interior of the container for conducting liquid therefrom, said conduit passing through such head and extending along that portion of the side of the receptacle body opposite said bung, said receptacle structure having a vent therein for releasing gaseous carbon dioxide into said container and a second vent therein for releasing gaseous carbon dioxide to the outside, said second vent offering resistance to the passage of the gas therethrough, whereby the container is constantly charged directly through said first vent with the gas under the desired liquid dispensing pressure.

4. In a dispenser of the character described, a closed liquid container, a conduit leading from the interior of the container for dispensing the liquid therefrom, a receptacle including a body incorporated within the container and opening to the outside through a wall thereof, a removable cover for the receptacle body, a heat insulated receiver for solid carbon dioxide removably disposed within said receptacle, said receiver having portions thereof spaced from the receptacle body to expose inner portions of said body to the gas generated from the solid carbon dioxide in said receiver, said receptacle structure being vented to release gaseous carbon dioxide into the interior of said container and also to the outside, the venting of the gas to the outside being controlled, whereby the container is constantly charged with gas under liquid dispensing pressure.

5. In a dispenser of the character described, a closed liquid container, a conduit leading from the interior of the container for dispensing the liquid therefrom, a receptacle incorporated within the container and including a body consisting of a side wall portion and an end, said member being joined at its edge opposite said end to a wall portion of the container marginally of an opening therein, a removable cover for said receptacle body, a heat insulated receiver for solid carbon dioxide removably disposed within said receptacle and having side wall portions at intervals in close proximity to the side wall portion of said receptacle, said receptacle having one vent therein for releasing gaseous carbon dioxide directly into said container, and a second vent for releasing gaseous carbon dioxide to the outside, said second vent offering resistance to the passage of the gas therethrough, whereby the container is constantly charged through said first vent with gas under liquid dispensing pressure.

6. In a dispenser of the character described, a closed liquid container of keg-like form, a receptacle for solid carbon dioxide including a body and a removable cover therefor, said body being disposed within the container and incorporated in the structure of one of its heads in position offset from the center of such head, a conduit leading from the interior of the container for conducting liquid therefrom, said conduit passing through such head and extending along that portion of the side of the receptacle body farthest removed from the side of the container, said receptacle being vented to release gaseous carbon dioxide into said container and to release gaseous carbon dioxide to the outside, the venting of the gas to the outside being attended with resistance, whereby the container is constantly charged with gas under liquid dispensing pressure.

7. In a dispenser of the character described, a closed liquid container of keg-like form having an inset head, a conduit leading from the interior of the container for dispensing the liquid therefrom, a receptacle for solid carbon dioxide including a body incorporated within the container and consisting of a side wall portion and an end, said side wall portion being joined at its edge opposite said end, to said head of the container marginally of an opening therein, a removable cover for said receptacle body, means for releasably clamping said cover in place, said means having a part secured to the end of the container within the confines of the chine encircling said inset head, said receptacle structure being vented to release gaseous carbon dioxide into said container and also to the outside, the venting of the gas to the outside being controlled, whereby the container is constantly charged with gas under liquid dispensing pressure.

8. In a dispenser of the character described, a closed liquid container of keg-like form having an upper head, a conduit leading from the interior of the container for dispensing the liquid therefrom, a receptacle within the container including a body incorporated in the structure of said upper head and consisting of a side wall portion and a bottom, said side wall portion being joined at its upper edge to said upper head of the container marginally of an opening therein, a removable cover for said receptacle body, a heat insulated receiver for solid carbon dioxide removably disposed within said receptacle and consisting of a side wall portion and a bottom, said side wall portions of said receptacle and receiver being of different outline in horizontal cross section, but at intervals relatively closely disposed, said receptacle having one vent for releasing gaseous carbon dioxide into said container and a second vent for releasing gaseous carbon dioxide to the outside, said second vent offering controlled resistance to the passage of the gas therethrough, whereby the container is constantly charged through said first vent with the gas under the desired liquid dispensing pressure.

9. In a dispenser of the character described, a heat insulating case, a closed liquid container of keg-like form having an upper head and chine, said case receiving the container and providing an enclosed space above and about the sides thereof, a conduit leading from the interior of the container for dispensing the liquid therefrom, a receptacle for solid carbon dioxide incorporated within the container, said receptacle being vented to the interior of the container for releasing carbon dioxide gas thereinto and vented to the outside of the container to release carbon dioxide gas directly into the basin formed by said head and chine and from which said gas may overflow along the sides of the container in said space between container and case.

10. In a dispenser of the character described, a heat insulating case, a closed liquid container of keg-like form having an upper head and chine, said case receiving the container and providing an enclosed space above and about the sides thereof, a conduit for dispensing liquid from the container, said conduit passing through said container and through the upper head of said container and through the top of said case, a receptacle for solid carbon dioxide incorporated within the container, said receptacle being vented to the interior of the container for releasing carbon dioxide gas thereinto and vented to the outside of the container to release carbon dioxide gas directly into the basin formed by said head and chine and from which said gas may overflow along the sides of the container in said space between container and case.

GEORGE B. MARZOLF.